United States Patent [19]

Halgrimson

[11] Patent Number: 4,607,389

[45] Date of Patent: Aug. 19, 1986

[54] COMMUNICATION SYSTEM FOR TRANSMITTING AN ELECTRICAL SIGNAL

[75] Inventor: Edwin A. Halgrimson, Naperville, Ill.

[73] Assignee: Amoco Corporation, Chicago, Ill.

[21] Appl. No.: 576,584

[22] Filed: Feb. 3, 1984

[51] Int. Cl.$^4$ ............................ H04B 7/15; H04B 1/36

[52] U.S. Cl. ........................................ 455/11; 455/54; 455/89

[58] Field of Search ............ 455/7, 11, 15, 16, 20–22, 455/25, 49, 54, 56, 89, 90; 358/108

[56] References Cited

U.S. PATENT DOCUMENTS

| | | | |
|---|---|---|---|
| 2,127,572 | 8/1938 | Peterson | 455/25 |
| 3,742,358 | 6/1973 | Cesaro | 455/11 |
| 3,745,462 | 7/1973 | Trimble | 455/11 |
| 3,768,016 | 10/1973 | Townsend et al. | 455/7 |
| 3,986,119 | 10/1976 | Hemmer, Jr. et al. | 455/54 |
| 4,051,525 | 9/1977 | Kelly | 358/108 |

OTHER PUBLICATIONS

"Solar Powered Microwave Radio Relay System" by Yokouchi et al., 9–1979.

Primary Examiner—Jin F. Ng

Attorney, Agent, or Firm—Thomas W. Tolpin; William T. McClain; William H. Magidson

[57] ABSTRACT

The present invention is a communication system for transmitting an electrical signal from a transmission tower and includes a first transceiver located adjacent the base of the tower and which is in communication with a source of an electrical signal which is to be transmitted. An enclosure is removably located adjacent the top of the tower and includes a second transceiver for receiving the transmitted electrical signal from the first transceiver and a third transceiver for retransmitting the electrical signal from the tower. By this arrangement there is no need for stringing coaxial cable from a ground based transmitter to the antenna mounted to the top of the tower, thereby eliminating the power loss associated with the use of such coaxial cable. In one embodiment of the present invention, the second and third transceivers are conveyed to and from the top of the tower via a pulley arrangement for maintenance purposes, and in an alternate embodiment, the second and third transceivers are enclosed within a housing and are conveyed to and from the top of the tower within a conduit by means of compressed air.

6 Claims, 5 Drawing Figures

COMMUNICATION SYSTEM FOR TRANSMITTING AN ELECTRICAL SIGNAL

BACKGROUND OF THE INVENTION

1. Field of the Invention

The present invention relates to radio communication systems utilizing radio transmission towers and, more particularly, to such a system which utilizes a first radio transmitter to transmit a received or generated electrical signal from a position on the ground to a radio transceiver positioned in an upper portion of the tower for broadcasting of the electrical signal out from the tower.

2. Setting of the Invention

The long distance transmission of information, such as voice, digital or analog data, utilizing radio frequencies requires a radio transmission tower, an antenna mounted to the tower, a radio transmitter, and a source of electrical power connected to the radio transmitter. The amount of power (in watts) used to transmit or broadcast the electric signal, the height of the tower, and the gain of the antenna all affect the initial cost and obviously the maintenance cost of any radio transmission system. Usually, the electrical signal which is to be transmitted is received at or generated within a ground transmission facility and is then communicated to the transmission antenna on the uppermost portion of the tower by way of a coaxial cable. It has been found that there is substantial power loss in or through the coaxial cable extending from the ground based transmitter to the tower mounted antenna. The amount of such power loss is determined by the diameter and type of the coaxial cable, as well as the frequency of the transmitted signal. For example, a five watt signal sent from the transmitter can lose as much as 70% of its power when measured at the antenna mounted on a 300 ft tower. Further, the use of coaxial cable is expensive from a purchase standpoint and is prone to water damage and shorting caused by rain, wind, and lightening. It is desirable to have a radio communication system which does not require the use of coaxial cable to connect the ground based transmitter to the tower mounted antenna.

Further, the maintenance of a radio transmission system can be very expensive. If there is any maintenance to be done to the coaxial cable and/or the antenna, then a maintenance man has to climb to the top of the tower, which is a dangerous procedure, and thus is very costly. Presently, such a "tower climber" charges approximately $2–$3 per foot to climb the tower which obviously can be extremely expensive even for a relatively short tower, such as 200–300 ft in height. There is a need for a radio communication system which does not utilize coaxial cable, as stated above, and which provides a simple, inexpensive mechanism for maintenance of the antenna without the need for a person to climb the tower or to utilize a large crane to reach the antenna on a short tower.

One radio communication system which does not utilize coaxial cable and protects the antenna from damage is a microwave transmission system where the radio transmitter and antenna are mounted on the ground adjacent a tower. The microwave signals are then directed to or aimed at an angled reflector on the tower so that the microwave signals will bounce off of the reflector and travel to a distant location. Such a microwave system is inoperative with regular radio signals, such as 100–1,000 mHz, because the radio energy *at that frequency* requires too large of a focusing dish to be practical.

SUMMARY OF THE INVENTION

The present invention provides a communication system for transmitting an electrical signal and which is contemplated to overcome the foregoing disadvantages. Within the communication system of the present invention, a first transceiver is located adjacent the base of the tower and is in communication with a source of the electrical signal to be transmitted. Second and third transceivers are removably located adjacent the top of the tower and include electrical devices for receiving the electrical signal transmitted from the first transceiver located on the ground, and electrical devices for retransmitting the electrical signal from the tower. In this manner, no coaxial cable is used thereby eliminating the power loss associated therewith.

In one embodiment of the present invention, the tower is provided with devices for conveying the second and third transceivers to and from a position adjacent the top of the tower by a pulley and cable mechanism and, in another embodiment, the second and third transceivers are enclosed within a housing and are placed within a conduit to be raised or lowered to a position adjacent the top of the tower by air pressure.

DETAILED DESCRIPTION OF THE PREFERRED EMBODIMENT

Disclosed herein is a communication system for transmitting an electrical signal which includes a first transceiver located adjacent the base of a transmission tower and which is in communication with a source of the electrical signal to be transmitted. Also included are a second and third transceivers removably located adjacent the top of the tower and which receive the electrical signal transmitted from the first transceiver and retransmit the electrical signal from the tower.

As used in this discussion, the term electrical signal is meant to be any signal to be transmitted and/or received and includes AM and FM radio signals, radio telephone, telephone, VHF and UHF television signals, Citizens Band (CB) radio signals, and other radio signals in commercial, private or military use. However, for the purposes of the present discussion, the electrical signals will be radio signals having a frequency of between about 100 to about 1,000 mHz. Further, the discussion will be directed to a two-way communication system, but a one-way transmission or receiving system can be made in accordance with this invention, as will be obvious to one skilled in the art.

Figure 1:
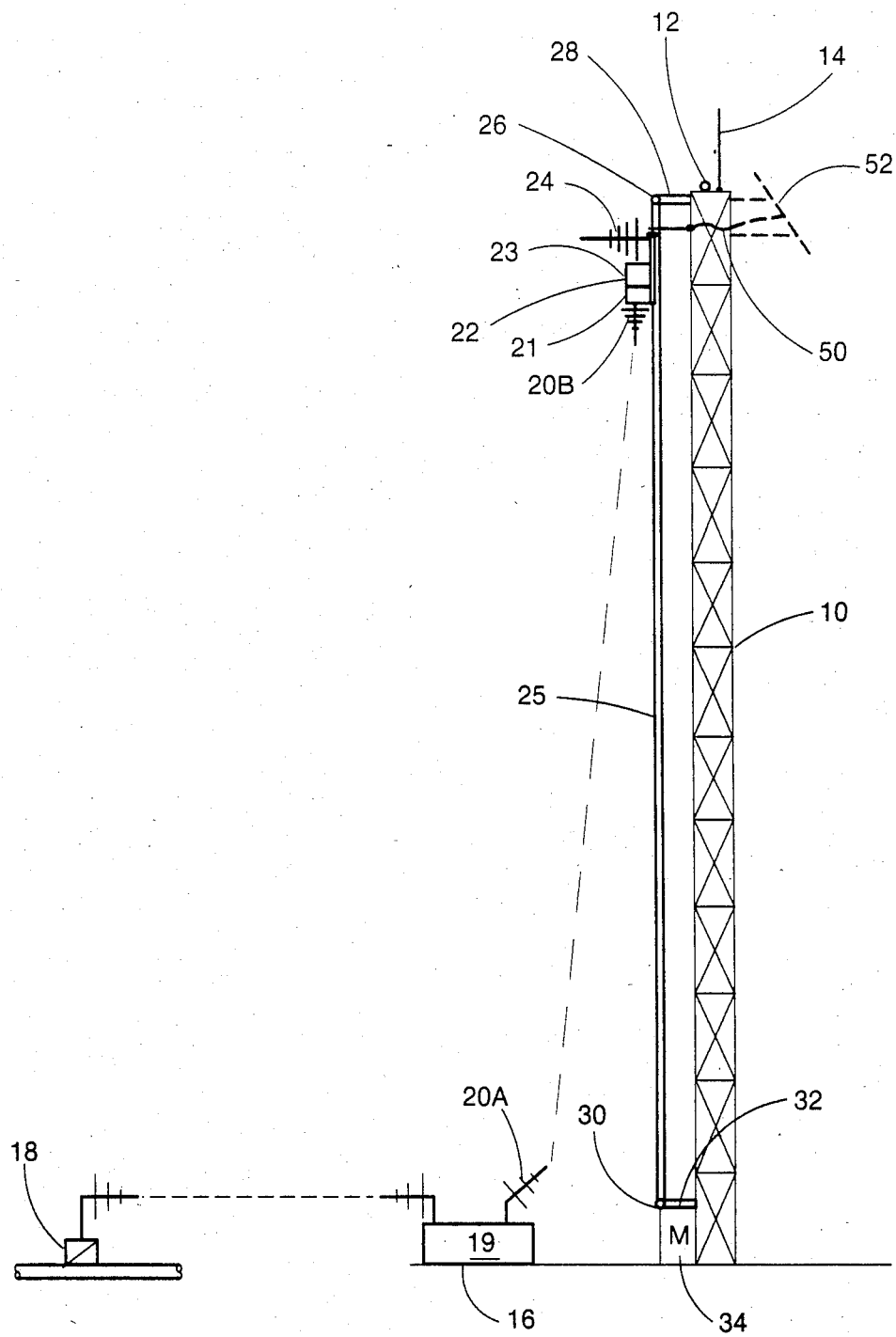
FIG. 1 is a diagrammatic representation of a communication system embodying the present invention.

One embodiment of the present invention is shown in FIG. 1, and includes a radio transmission tower 10 of any desired height and configuration and which is provided with suitable aircraft collision lighting 12, as well as lightning arresting rods 14. The tower 10 can be equipped with support or guy wires (not shown) as is well known in the art. Electrical signals are either received into or generated within an enclosure 16 on the ground. The enclosure 16 can be a simple "doghouse" with repeating electrical devices or transmitters, or as complex as a full radio or TV transmission studio. In the embodiment shown in FIG. 1, the electrical signals are sent by wire, phone line, optical fiber, radio or the like from any type of reading, measuring or data transmission device, such as a remote terminal unit (RTU) 18 connected to an operational device, such as a valve or flow meter, to the enclosure 16.

The electrical signals received from the remote terminal unit(s) 18 are passed to a first transceiver 19, which can have a low power rating (for example, less than about 100 milliwatts). The electrical signal, in the form of radio frequency energy of less than about 100 milliwatts, is radiated by the transmitter portion of the first transceiver 19 through an antenna 20A to an antenna 20B connected to a second transceiver 21 mounted within an enclosure 22. There the received electrical signal is cross-coupled (receiver to transmitter) to a third transceiver 23 mounted within the enclosure 22. This third transceiver 23 has a transmitter (for example, of about 1-5 watts in power) which radiates the electrical signal from an antenna 24 to remote locations. In the preceding examples, the reception or broadcast range of such electrical signals sent from the tower 10 would be about 1-50 miles. When any electrical signals are *received* via the antenna 24, it is received in the receiver portion of the third transceiver 23; there it is cross-coupled to the low power (less than 100 milliwatts) transmitter of the second transceiver 21 and radiated through the antenna 20B to the ground where it is received by the antenna 20A of the transceiver 19. The receiver of transceiver 19 is then cross-coupled (receiver to transmission devices) to the telephone line, radio, fiber optic cable, or wireline, and back to the remote terminal units 18 for corrective action or the like.

In the preceding example, it should be understood that the frequencies used to transmit and receive the electrical signals are different for simultaneous transmission. For example, the first transceiver 19 will transmit on frequency No. 1 and receive on frequency No. 2, while the second transceiver 21 will transmit on frequency No. 2 and receive on frequency No. 1 and then be electrically cross coupled to the third transceiver 23, which will transmit on frequency No. 3 and receive on frequency No. 4. As can be understood, this arrangement of transceivers eliminates the need to use coaxial cable to connect the ground based transmitter to the antenna on the tower 10.

Figure 2:
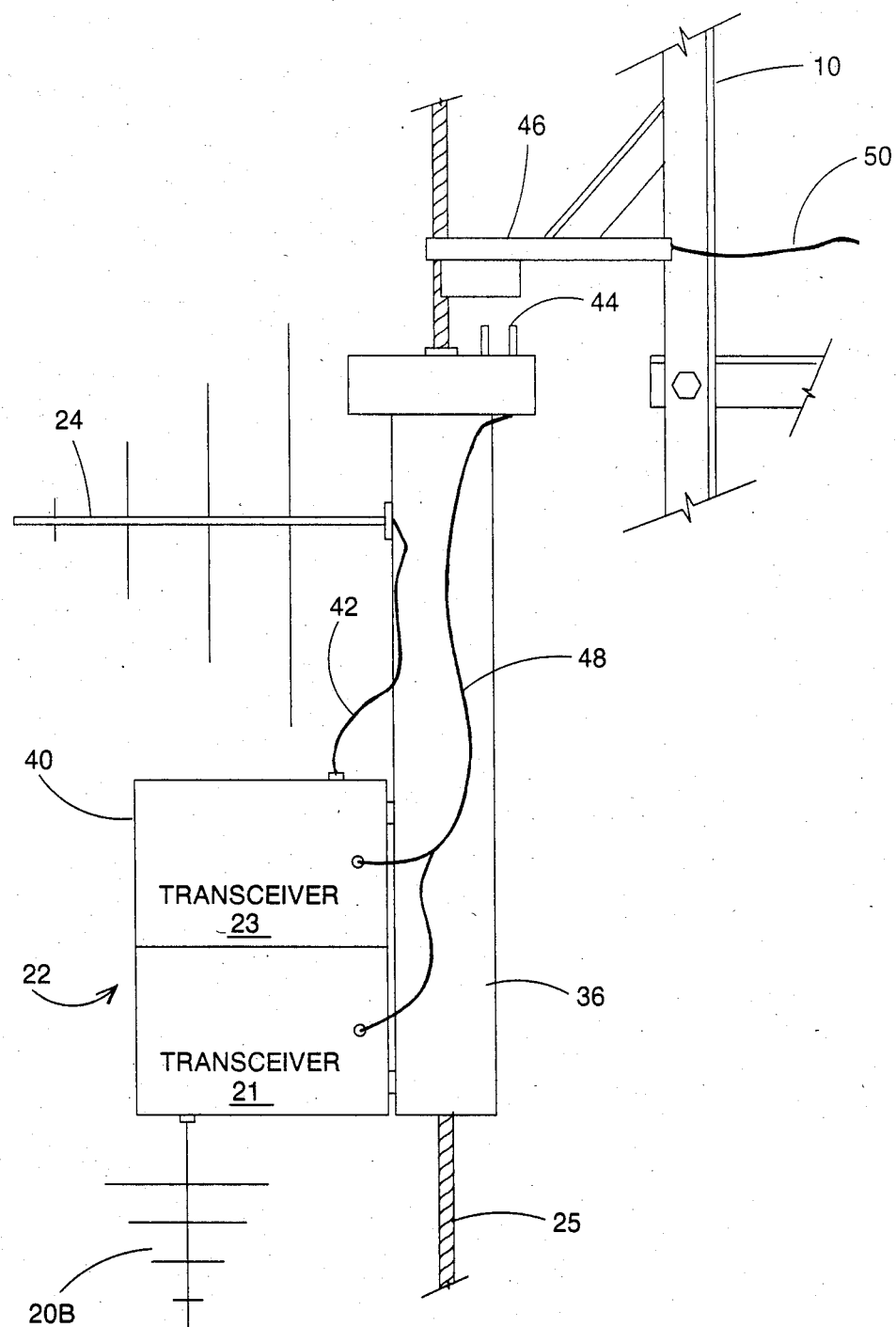
FIG. 2 is an elevational view of one embodiment of the present invention.

As shown in FIGS. 1 and 2, the enclosure 22 can be lowered from and raised to a position adjacent the top of the tower 10 via a cable and pulley arrangement wherein a cable 25 is passed around an upper pulley 26, connected to a brace 28, which is in turn connected to the tower 10, and around a lower pulley 30 connected to a brace 32, connected to a bottom portion of the tower 10. A drive motor 34 or hand crank is connected to the pulley 30 to move or advance the cable 25 to raise or lower the enclosure 22. The drive motor 34 can be provided with a latching or locking mechanism to prevent the cable 25 from moving when the enclosure 22 is in position adjacent the top of the tower 10. As can be seen, the cable 25 provides a way for the enclosure 22 to be lowered to the ground level for ease of maintenance thereby eliminating the need of a "tower climber".

As shown in FIG. 2, the enclosure 22 includes a conduit 36 through which the cable 25 extends and is therein clamped or restrained. The second and third transceivers 21 and 23 are contained within a sealed housing 40 for environmental protection and are connected to the conduit 36 in any desired manner. The lower portion of the housing 40 is provided with the receiving antenna 20B which is used for receipt of the electrical signal transmitted from the first transceiver 19 on the ground. A directional or an omnidirectional antenna 24 is connected to the conduit 36 or the housing 40 and is in communication with the third transceiver 23 by way of a cable 42. A source of electrical power is connected to the transceivers 21 and 23, when the enclosure 22 is landed adjacent the top of the tower by way of pin-type connectors 44 mounted to the top of the conduit 36 and which are received into a cooperable receptacle 46, via a cable 48. When the enclosure 22 is landed at the top of the tower 10, the connectors 44 are received into the cooperable connectors 46 (rigidly mounted to the tower 10) and then placed in communication with a suitable power source via a cable 50. The power source can be DC or AC power provided to the top of the tower 10 via an electrical cable or a battery pack (not shown) connected to the top of the tower 10 and which can be trickle charged by a solar panel 52 (as shown in dotted lines in FIG. 1). If desired, a second connection device (not shown) can be provided such that the antenna 24 can be mounted permanently to the top of the tower 10 and the enclosure 22 would not be provided with its own directional or omnidirectional antenna, but would connect into communication with the permanently mounted antenna. Further, the cable 25 can be received within a slotted or channeled vertical brace (not shown) mounted adjacent the top of the tower 10 such that the antenna 24 will be held steady and correctly aimed in the desired direction and thus will not be affected by the wind.

Whenever the enclosure 22 is to be lowered from the tower 10 for inspection and maintenance purposes, any latching mechanism is released and the drive motor 34 is activated to lower the cable 25. Upon completion of the maintenance, the drive motor 34 is reversed and the enclosure 22 is raised to a position adjacent the top of the tower 10 and is reconnected into the connectors 46 to provide electrical power to the transceivers 21 and 23. The tower 10 can be provided with contact switches or the like so that when the enclosure 22 is landed at the top of the tower 10 a contact switch is activated to turn off the drive motor 34 and can also automatically activate the latching mechanism to maintain the enclosure 22 in position.

Figure 3:
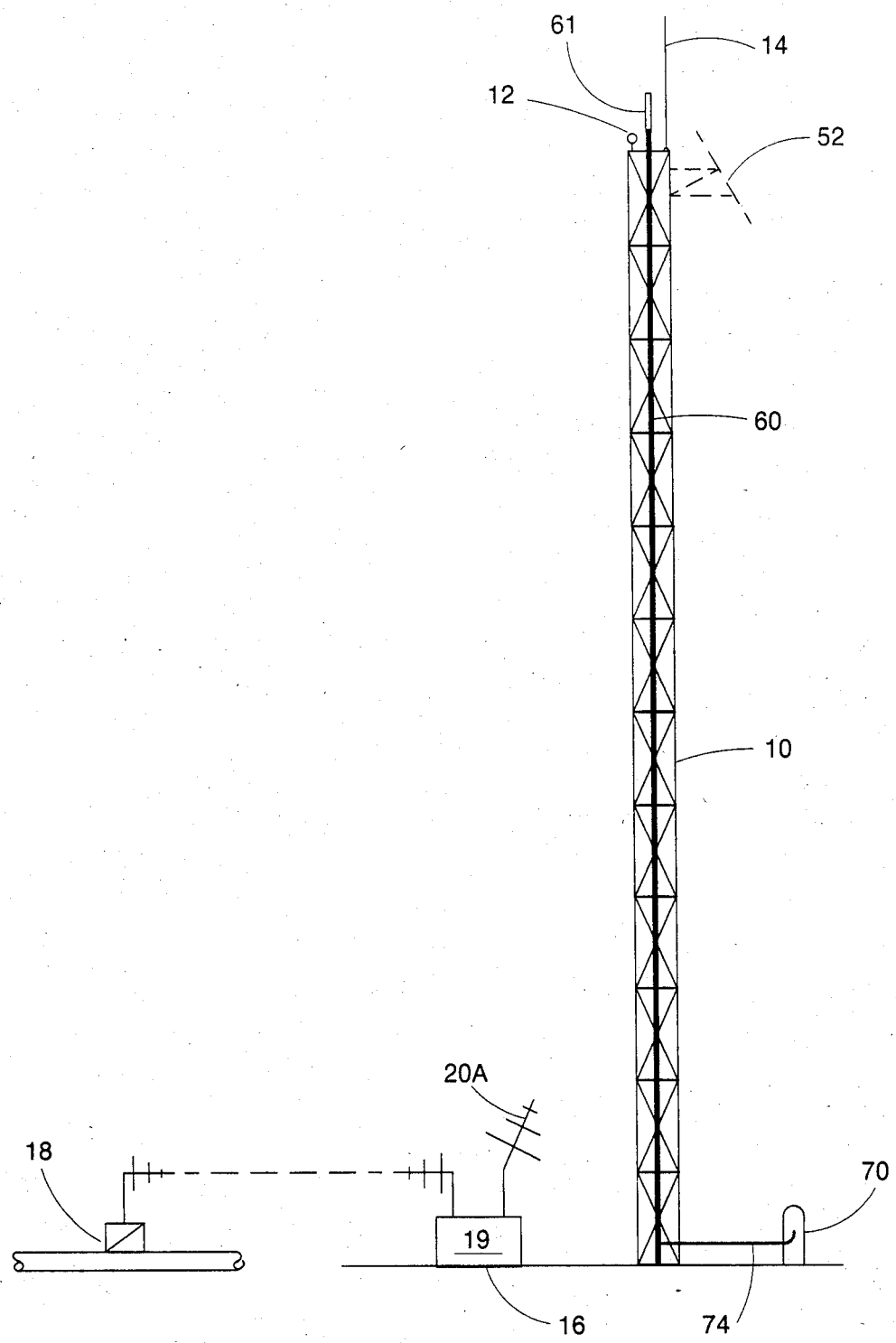
FIG. 3 is a diagrammatic representation of an alternate embodiment of the communication system embodied in the present invention.
Figure 4:
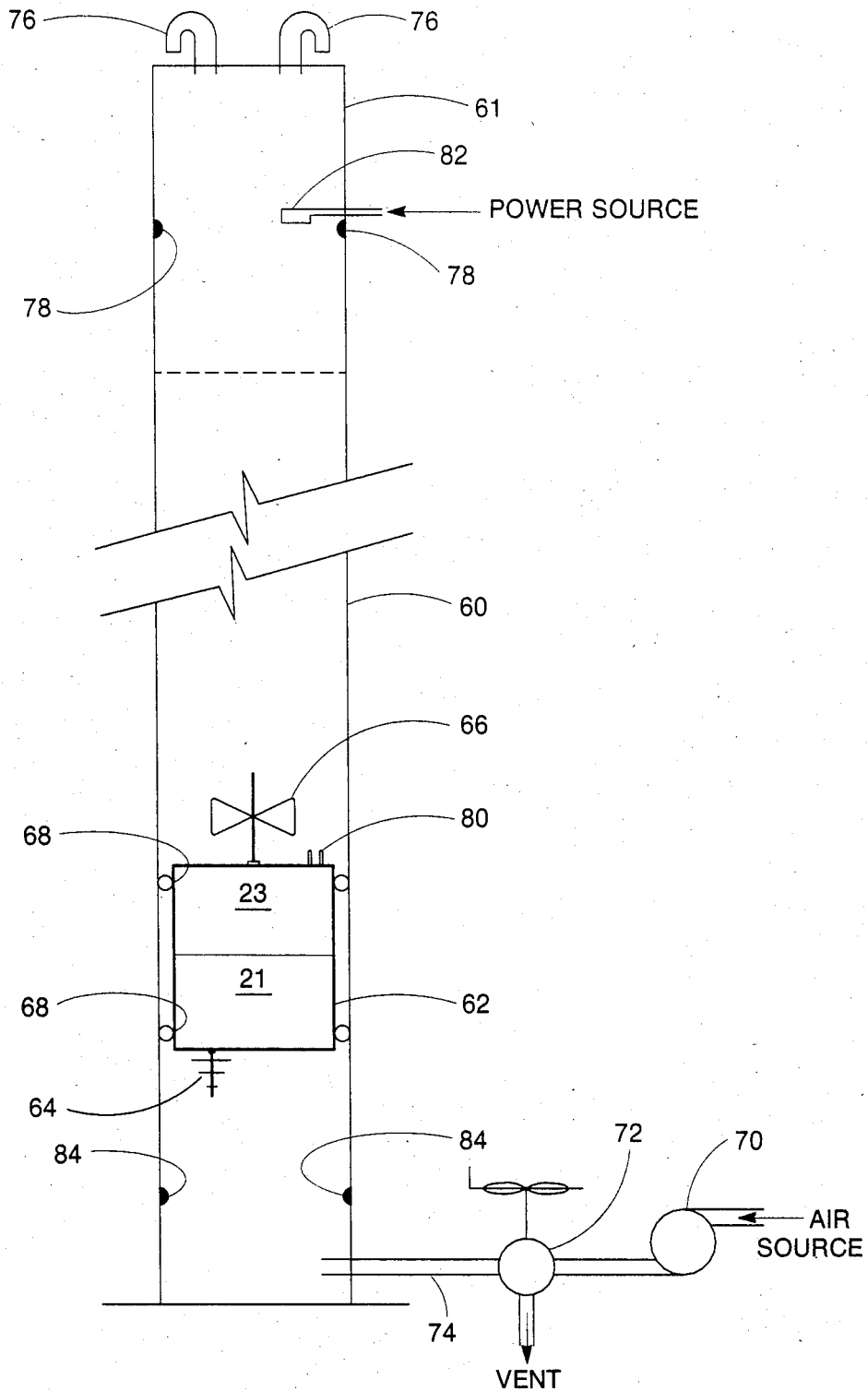
FIG. 4 is a diagrammatic representation of a conveyance mechanism of the embodiment of the present invention shown in FIG. 3.

An alternate embodiment of the present invention is shown in FIGS. 3 and 4 and includes an alternate means for conveying the enclosure 22, with the transceivers 21 and 23 therein, to and from the top of the tower 10. Instead of a cable conveyance means, a tube or conduit 60 extends from the base of the tower 10 to the top of the tower and can be provided with a visually clear, as well as electrically "clear", uppermost portion 61. The transceivers 21 and 23 are sealed within an enclosure 62 and are provided with the radio receiving antenna 64 for receipt of the electrical signal from the first transceiver 19, as well as a bow-tie type or other similar type of radio transmission antenna 66 for retransmission of the electrical signal out from the tower 10. The enclosure 62 is provided with at least two annular sealing devices 68, such as rubber or Teflon O-rings, and is placed within the conduit 60 through an access hatch (not shown). The sealing devices 68 provide an air tight seal between the interior wall of the conduit 60 and the enclosure 62. A pressurized air source from a pump 70 is provided through a vent valve 72 and a conduit 74 and then into the interior of the conduit 60 beneath a lower seated position of the enclosure 62. The bottom of the conduit 60 is air tight, while the upper part of the conduit 60 and/or 61, adjacent the top of the tower 10, is provided with air vents with suitable baffles, filters, or goosenecks 76 to prevent water and other material from entering into the interior of the conduit 60.

When the enclosure 62 is to be raised to a position adjacent the top of the tower 10, the pump 70 is activated and the vent valve 72 positioned such that pressurized air flows into the interior of the conduit 60 to push the enclosure 62 upward. When the enclosure 62 lands against a stop or upstart 78 (adjacent the top of the tower 10), it is received into connection with a suitable power source by electrical connectors 80 on the enclosure 62 being received into a cooperable electrical connector 82, which extends into the interior of the conduit 60. The power source can be any suitable voltage and amperage provided via a cable (not shown) from the ground or by a battery (not shown) trickle charged by the solar panel 52. Also, the enclosure 22 can be connected through an additional electrical connector device (not shown) to an auxiliary antenna permanently mounted to the tower 10, as described earlier.

The enclosure 62 can be maintained adjacent the top portion of the tower 10 by constant air pressure provided by the pump 70, by periodic application of air pressure, and/or releasable latching mechanisms (not shown) on the enclosure 62 with the position of the enclosure 62 being monitored by microswitches (not shown) within the conduit 60 to detect the movement and/or exact position of the enclosure 62 within the conduit 60. Further, the interior of the conduit 60 can be provided with a rail or channel (not shown) cooperable with a guide on the enclosure 62 to ensure the proper orientation of the enclosure 62 within the conduit 60 for connection between the connectors 80 and 82.

When the enclosure 62 is to be removed from the conduit 60 for maintenance, any latching mechanisms are released electronically or manually and the valve 72 is positioned to vent the compressed air within the conduit 60 to allow the enclosure 62 to slowly fall within the conduit 60 until it comes to rest against lower upstarts 84 within the conduit 60. An important benefit of this conveyance system is that the radio transceiver and antennas are always mounted internally within the conduit 60 and are thereby protected from wind, rain, ice, etc.

Figure 5:
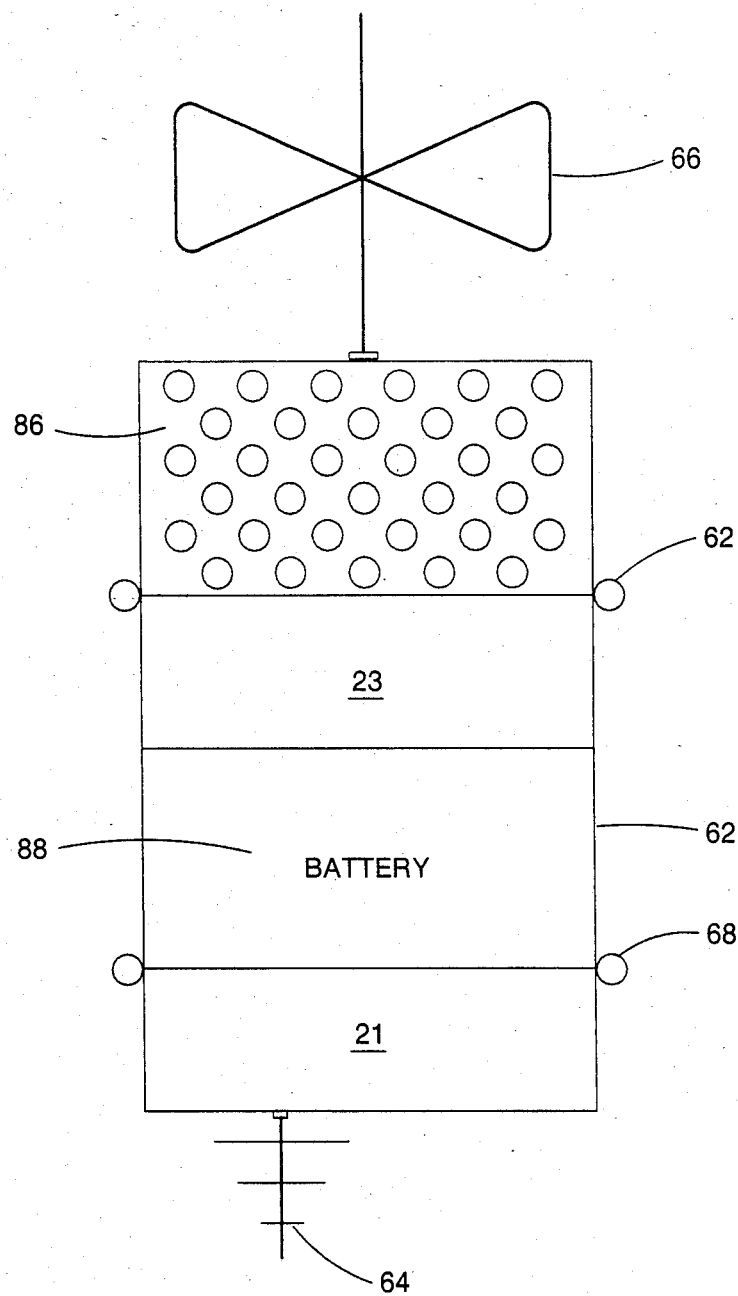
FIG. 5 is a diagrammatic representation of an alternative embodiment of the present invention for use in the embodiment shown in FIG. 3.

FIG. 5 illustrates an alternate embodiment of a radio transceiver enclosure for use within the conduit conveyance system shown in FIGS. 3 and 4. In this embodiment, solar panels or solar cells 86 are connected around the enclosure 62 such that when the enclosure 62 is conveyed to the upper portion of the conduit 60, sunlight comes through the visually clear portion 61 of the conduit 60 and the solar cells 86 charge an internal battery 88. In this embodiment, there would be no need for power cables to extend up to the top of the tower 10, or have a separate solar panel and battery charging system on the tower 10.

The towers utilized in the present invention can be of any size, material, and configuration; however, most towers utilized for the present invention will be from about 200' to about 1,000' in height. Also, the frequencies utilized can usually be between about 100 to about 1,000 mHz. With the higher the frequency, the smaller the transmission antenna is required. For example, a frequency of about 500 mHz will require a three foot long directional antenna 24 while a frequency of about 850 mHz will require only about a 8 inch long antenna, such as a bow-tie type antenna 66 that can easily fit within the conduit 60.

The first transceiver 19 on the ground can have a power of less than about 100 milliwatts and will have sufficient range and clarity to be clearly received by the second transceiver 21 located adjacent the top of the tower 10. The transceiver 21 includes a radio receiver to receive the electrical signal from the first transceiver 19 and is in communication with the third transceiver 23 through a demodulator and/or filter. The second transceiver 21 can have a power of about 100 milliwatts and the third transceiver 23 can have a power capability of from about 1 to about 20 watts or more if desired.

The transceivers 21 and 23 (for low wattages) can be fitted within very small enclosures, such as from 2" to about 8" OD and from about 8" to about 2' in length (depending if a battery is included). Also, the weight of the radio equipment within an enclosure can be from about 1.5 lbs up to about 15 lbs (including batteries). The enclosures 62 can be formed from plastic, aluminum, or fiberglass for lightness of weight. With such weights, the cable 25 can be as small as ⅛" OD steel cable and up to about ¼" OD steel cable. Also, the air pressure within the conduit 60 can be as low as 3 psi to raise a 10.0 lb enclosure 62. The air pressure required obviously depends upon the weight of the enclosure 62 and radios and antennas to be raised but will not be higher than the pressure rating of the conduit, such as 100 psi for ¼" walled PVC pipe. Further, the voltages and amperages required for the transceivers 21 and 23 will depend upon the type of transceiver utilized; however, for most purposes a voltage of 15 VDC supplied via a power cable, battery and/or solar panel is more than adequate.

It should be understood that while the present invention and its embodiments have been described in particular relation to two way communication, i.e., from the RTU's to the first transceiver and then to the second and third transceivers for general broadcast, the present invention can be utilized for one way communications. For one way communication, the first transceiver unit will include a transmitter or receiver only, and the second and third transceivers will have only transmitters or receivers, as will be obvious to one skilled in the art.

Wherein the present invention has been described in particular relation to the drawings attached hereto, it should be understood that other and further modifications, apart from those shown or suggested herein, may be made within the scope and spirit of the present invention.

I claim:

1. A communication system for transmitting an electrical signal, comprising:
   an operational device;

a remote terminal unit connected to said operational device for sending an electrical signal;

an elongated, substantially upright, transmission tower having a base providing a bottom in proximity to the ground and an upper portion providing a top spaced substantially above said base;

a stationary first transceiver fixedly secured and mounted near said base of said transmission tower for receiving said electrical signal from said remote terminal unit;

a first antenna connected to said first transceiver;

said first transceiver having a ground based stationary transmitter for radiating said electrical signal through said first antenna;

a second transceiver having a receiver;

a second antenna connected to and extending below said receiver of said second transceiver for receiving said electrical signal from said first antenna of said first transceiver and for passing said electrical signal to said receiver of said second transceiver in the absence of a coaxial cable connecting said first transceiver to said second transceiver;

a third transceiver cross-coupled to and positioned above said second transceiver, said third transceiver having an aboveground transmitter for transmitting said electrical signal from the receiver of said second transceiver to another remote terminal unit;

a third antenna connected to and positioned above said third transceiver for radiating said electrical signal from said aboveground transmitter of said third transceiver to said remote terminal unit;

a moveable enclosure substantially enclosing said second transceiver including said receiver and said third transceiver including said aboveground transmitter; and conveying means for conveying said moveable enclosure containing said second and third transceivers, from said base of said tower to said top of said tower.

2. A communication system for transmitting an electrical signal, comprising:

a first transceiver located adjacent the base of a transmission tower and which is in communication with a source of the electrical signal to be transmitted;

a second transceiver removably located adjacent the top of the tower and which includes means for receiving the electrical signal from the first transceiver and means for interconnecting with a third transceiver from which the electrical signal is transmitted;

the tower including means for conveying the second and third transceivers to and from a position adjacent the top of the tower;

the tower including means for conveying the second and third transceivers to and from a position adjacent the top of the tower;

the means for conveying comprising a cable with the second and third transceivers mounted in a housing connected thereto with the cable suspended around a pulley connected to the tower adjacent the top thereof and around a pulley connected to the tower adjacent the base thereof, and including motor drive means for advancing the cable to move the housing to and from a position adjacent the top of the tower;

a conduit connected to the cable with the second and third transceivers connected to the conduit;

a first antenna connected to the second transceiver for reception of the electrical signal from the first transceiver;

a second antenna connected to the conduit for retransmission of the electrical signal from the third transceiver; and power connection means for removable interconnection of the second and third transceivers with a source of electrical power connected adjacent the top of the tower.

3. The communication system of claim 2 wherein said electrical power source on said top of said tower comprises a battery pack trickle charged by and connected to a solar panel.

4. A communication system for transmitting an electrical signal, comprising:

a first transceiver located adjacent the base of a transmission tower and which is in communication with a source of the electrical signal to be transmitted;

a second transceiver removably located adjacent the top of the tower and which includes means for receiving the electrical signal from the first transceiver and means for interconnecting with a third transceiver from which the electrical signal is transmitted;

the tower including means for conveying the second and third transceivers to and from a position adjacent the top of the tower; and the means for conveying comprising a conduit connected to the tower and extending from the base to a position adjacent the top thereof, and a supply of pressurized air in communication with the interior of the conduit whereby the second and third transceivers are received within the conduit for reciprocal movement by way of air pressure within the conduit to and from a position adjacent the top of the tower.

5. The communication system of claim 4 wherein a source of electrical power is removably connected to the second and third transceivers.

6. The communication system of claim 4 including: a tubular housing enclosing said detachable transceiver and said transmitter for reciprocal movement within said conduit, and said housing encloses the second and third transceivers.

* * * * *

UNITED STATES PATENT OFFICE
CERTIFICATE OF CORRECTION

Patent No.  4,607,389                    Dated  August 19, 1986

Inventor(s)  Edwin A. Halgrimson

It is certified that error appears in the above-identified patent and that said Letters Patent are hereby corrected as shown below:

Patent

| Column | Line  |                                                                              |
|--------|-------|------------------------------------------------------------------------------|
| 1      | 39    | "lightening" should be -- lightning --                                       |
| 2      | 51    | after "are" delete -- a --                                                   |
| 6      | 14    | "about a 8" should be -- about an 8 inch --                                  |
| 7      | 55-57 | delete lines 55-57 (duplicate)                                               |
| 8      | 53-54 | delete "enclosing said detachable transceiver and said transmitter"          |

Signed and Sealed this

Fifth Day of January, 1988

Attest:

DONALD J. QUIGG

Attesting Officer

Commissioner of Patents and Trademarks